United States Patent
Cooke et al.

(10) Patent No.: US 8,286,325 B2
(45) Date of Patent: *Oct. 16, 2012

(54) HINGED FIBER OPTIC MODULE HOUSING AND MODULE AND METHODS OF MANUFACTURE AND ASSEMBLY

(75) Inventors: Terry L. Cooke, Hickory, NC (US); David L. Dean, Jr., Hickory, NC (US); Tory A. Klavuhn, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 461 days.

This patent is subject to a terminal disclaimer.

(21) Appl. No.: 12/415,454

(22) Filed: Mar. 31, 2009

(65) Prior Publication Data

US 2010/0242251 A1    Sep. 30, 2010

(51) Int. Cl.
    *B21B 1/46*     (2006.01)
(52) U.S. Cl. ...................................................... 29/527.2
(58) Field of Classification Search ............... 29/527.2, 29/428, 458, 455.1; 264/328, 319; 385/135
    See application file for complete search history.

(56) References Cited

U.S. PATENT DOCUMENTS

| | | | |
|---|---|---|---|
| 4,949,376 | A | 8/1990 | Nieves et al. |
| 5,708,742 | A | 1/1998 | Beun et al. |
| 6,078,661 | A | 6/2000 | Arnett et al. |
| 6,127,627 | A | 10/2000 | Daoud |
| 6,385,381 | B1 | 5/2002 | Janus et al. |
| 6,466,724 | B1 | 10/2002 | Glover et al. |
| 7,496,269 | B1 | 2/2009 | Lee |
| 7,743,495 | B2 | 6/2010 | Mori et al. |
| 2002/0150372 | A1 | 10/2002 | Schray |
| 2006/0193590 | A1 | 8/2006 | Puetz et al. |
| 2007/0104447 | A1 | 5/2007 | Allen |
| 2008/0011514 | A1 | 1/2008 | Zheng et al. ................ 174/72 R |
| 2009/0185782 | A1 | 7/2009 | Parikh et al. |
| 2009/0208178 | A1 | 8/2009 | Kowalczyk et al. |

(Continued)

FOREIGN PATENT DOCUMENTS

EP      1777563 A1      4/2007

(Continued)

OTHER PUBLICATIONS

Patent Cooperation Treaty, International Search Report for International Application No. PCT/US2010/027402, Jun. 16, 2010, 1 page.

(Continued)

*Primary Examiner* — John C Hong

(57) ABSTRACT

Embodiments disclosed include fiber optic module housings used for fiber optic modules and methods for manufacture and assembly of same. The fiber optic module housing comprise at least one hinge to allow a component of the housing to be opened and closed to allow easy access to the fiber optic module housing and/or its internal chamber. The hinge may be a living hinge disposed within a single part to allow each side of the living hinge to be bent or folded. The hinge may be disposed on a panel configured to support one or more fiber optic components to allow the panel to be opened and closed about the module housing for access. The fiber optic module housing may also be entirely comprised of a single part employing the use of living hinges between foldable parts. In this manner, no sides or parts of the fiber optic module housing need be provided as separate parts.

26 Claims, 8 Drawing Sheets

U.S. PATENT DOCUMENTS

2010/0142910 A1     6/2010   Hill et al.
2010/0220967 A1*   9/2010   Cooke et al. .................. 385/135

FOREIGN PATENT DOCUMENTS

FR              2378378       8/1978
WO    WO2007/149215    12/2007
WO      2009120280 A2   10/2009

OTHER PUBLICATIONS

Non-Final Rejection mailed Sep. 1, 2011, for U.S. Appl. No. 12/394,114, 9 pages.
Final Rejection mailed Dec. 22, 2011, for U.S. Appl. No. 12/394,114, 9 pages.
International Search Report issued Jun. 23, 2010, for PCT/US2010/024888, 2 pages.

* cited by examiner

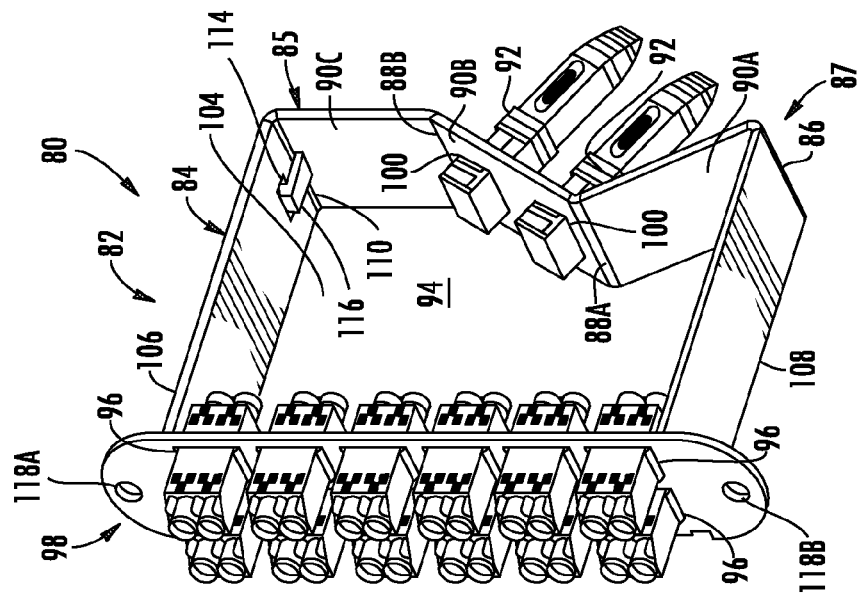
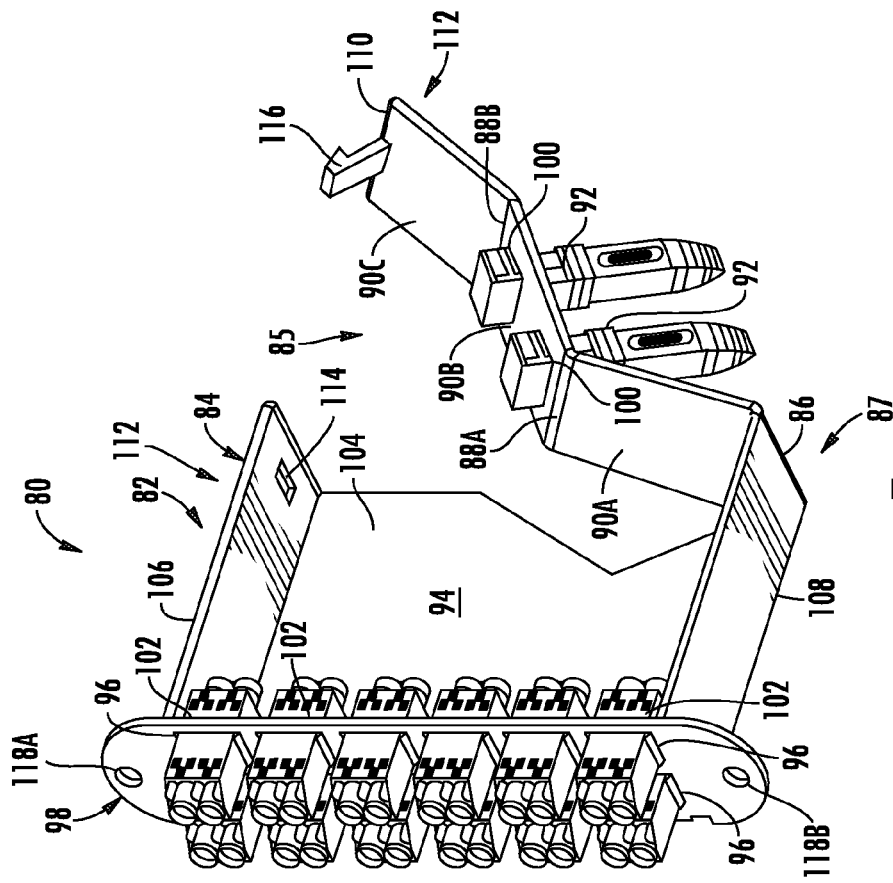

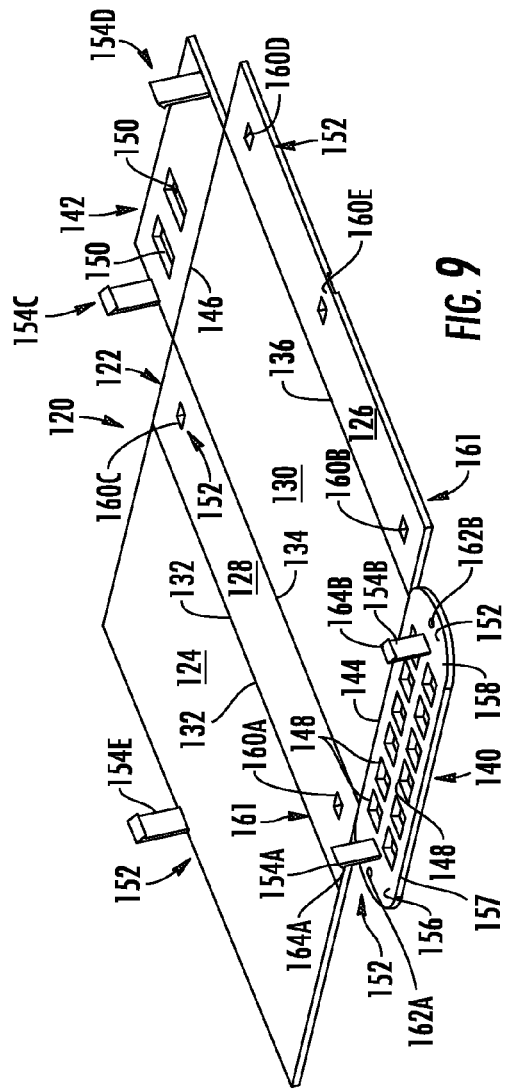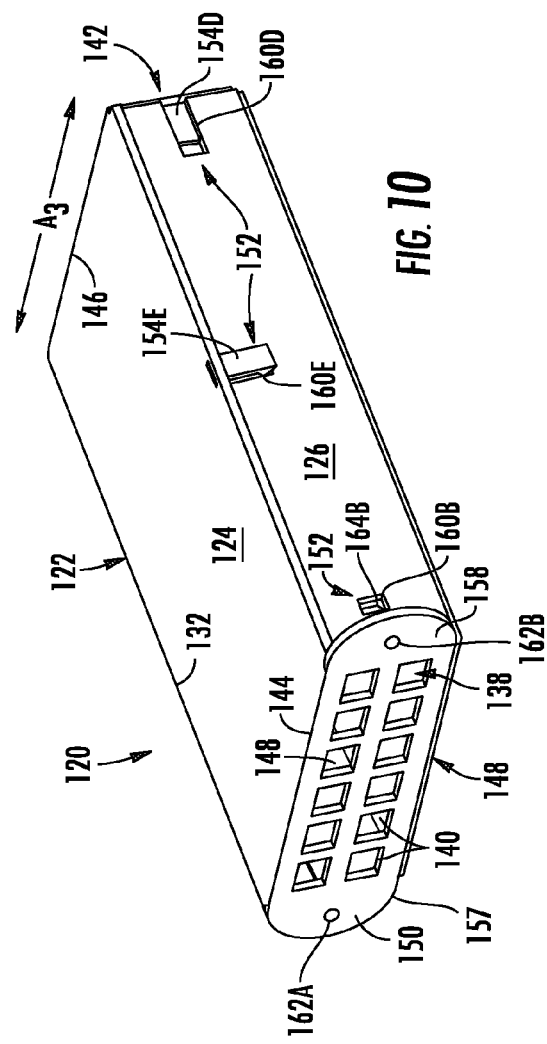

HINGED FIBER OPTIC MODULE HOUSING AND MODULE AND METHODS OF MANUFACTURE AND ASSEMBLY

BACKGROUND

1. Field of the Disclosure

The technology of the disclosure relates to fiber optic module housings and modules that support fiber optic connections and methods of manufacture and assembly of same.

2. Technical Background

Benefits of optical fiber use include extremely wide bandwidth and low noise operation. Because of these advantages, optical fiber is increasingly being used for a variety of applications, including but not limited to broadband voice, video, and data transmissions. Fiber optic networks employing optical fibers are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections.

Fiber optic components provided in a fiber optic module may be difficult to access during assembly and in the field when establishing and modifying connections as well as when cleaning due to limited finger access. The fiber optic components may be removed from the fiber optic module to gain sufficient access and then re-installed. For example, the fiber optic components may be removed for cleaning during loss insertion testing. However after cleaning, the operator may not fully establish a fiber optic connection to a particular fiber optic component. Even so, the fiber optic module may still pass the loss insertion testing. However, subsequently during transport or operation, the fiber optic connection to a fiber optic component may become disconnected. As a result, a customer service call or report may be generated reporting a perceived broken optical fiber or fiber optic component for a fiber optic module that does not actually exist.

Thus, a need exists to provide a fiber optic module that allows for easy accessibility of components, including but not limited to connectors and adapters, to avoid or reduce the possibility of partially latching of components, including fiber optic connectors into fiber optic adapters, when installing and re-installing connections.

SUMMARY OF THE DETAILED DESCRIPTION

Embodiments disclosed in the detailed description include fiber optic module housings and modules. The fiber optic module housing comprises at least one hinge disposed between a portion of a main body and a panel configured to support one or more fiber optic components. The panel can be opened from and closed against or substantially against the main body about the hinge. In this manner, the panel can be opened from the main body to provide enhanced access to the panel, fiber optic components disposed in the panel, and/or the internal chamber of the fiber optic module housing. In certain embodiments, the hinge is a living hinge made from a material joining the panel and a portion of the main body that allows the panel to bend along the living hinge with respect to the main body. The panel and main body may be constructed out of one part with the living hinge disposed in the part therebetween to provide a hinge between the panel and main body. In other embodiments, the hinge is a separate part disposed between and attached to the panel at a portion of the main body.

In other embodiments, the fiber optic module housing is comprised of a single part that is foldable for assembly employing the use of one or more living hinges. The fiber optic module housing comprises one or more living hinges disposed between a first end section and a second end section of a main body. One or more locking mechanisms are disposed between the first end section and the second end section and configured to interlock to form an internal chamber in the main body of the fiber optic module housing. Intermediate sections can be provided and disposed between the first end section and the second end section via one or more living hinges disposed therebetween to allow the intermediate sections to bend and fold about adjacent sections to form the fiber optic module housing. One or more panels can be connected to the main body each having one or more fiber optic component openings configured to support one or more fiber optic components disposed therein to form a fiber optic module from the fiber optic module housing.

Embodiments disclosed herein also include manufacturing of fiber optic module housings and assembly of the fiber optic module housings to form fiber optic modules. In certain embodiments, the fiber optic module housing is created from a mold using a molding process to form a pre-molded part. The molding process can be any type of molding process desired, such as injection and insertion molding for example. An extrusions process may also be employed to form the fiber optic module housing. The fiber optic module housing can be formed from a material, such as a thermoset or thermplastic material as examples. One or more thinned sections are formed in the fiber optic module housing to form a living hinge.

After the fiber optic module housing is formed, a fiber optic module can be assembled using the fiber optic module housing. Assembly can occur immediately after the molding process, or during a separate assembly process. Assembly includes inserting fiber optic components, such as fiber optic adapters, and/or a fiber optic cable harness into the fiber optic module housing. The fiber optic components can be disposed through openings disposed in the fiber optic module housing. A fiber optic cable harness can be installed in the fiber optic module housing and connected to the fiber optic components while a body or panel is opened about a living hinge to provide enhanced access to the fiber optic module housing. The fiber optic cable harness can be disposed inside an internal chamber of the fiber optic module housing and the fiber optic module housing secured to form an assembled fiber optic module.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

BRIEF DESCRIPTION OF THE FIGURES

FIG. 7 is an alternate exemplary fiber optic module incorporating a living hinge between an opened rear panel and a main body of a fiber optic module housing;

FIG. 8 is the fiber optic module of FIG. 7 with the rear panel closed to the main body of the fiber optic module housing;

FIG. 9 is an alternate exemplary unassembled fiber optic module housing incorporating living hinges between joint interfaces of the fiber optic module housing; and FIG. 10 is the fiber optic module housing of FIG. 9 assembled.

DETAILED DESCRIPTION OF THE PREFERRED EMBODIMENTS

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic module housings and modules. The fiber optic module housing comprises at least one hinge disposed between a portion of a main body and a panel configured to support one or more fiber optic components. The panel can be opened from and closed against or substantially against the main body about the hinge. In this manner, the panel can be opened from the main body to provide enhanced access to the panel, fiber optic components disposed in the panel, and/or the internal chamber of the fiber optic module housing. In certain embodiments, the hinge is a living hinge made from a material joining the panel and a portion of the main body that allows the panel to bend along the living hinge with respect to the main body. The panel and main body may be constructed out of one part with the living hinge disposed in the part therebetween to provide a hinge between the panel and main body. In other embodiments, the hinge is a separate part disposed between and attached to the panel at a portion of the main body.

Figure 1:
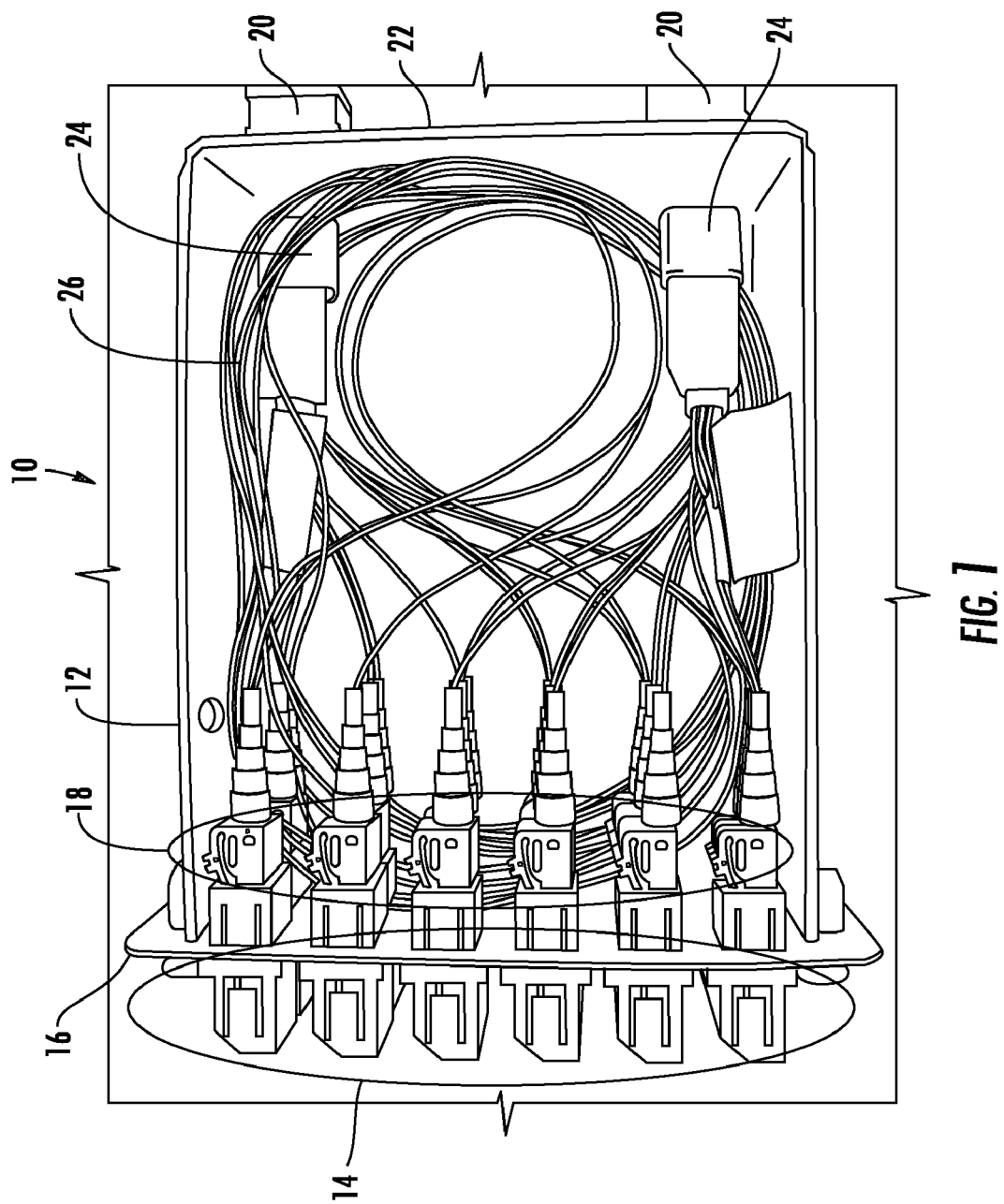
FIG. 1 is an exemplary fiber optic module illustrating fiber optic connections inside a fiber optic module housing.

FIG. 1 illustrates an example of what may be termed a high density fiber optic module 10. The side cover of the fiber optic module 10 is removed so that the fiber optic components and cables contained therein can be seen. As illustrated therein, the fiber optic module 10 is comprised of a housing 12 containing twelve (12) duplex LC fiber optic adapters 14 on a front side 16 of the fiber optic module 10 for supporting up to twelve (12) duplex LC fiber optic connectors 18. The housing 12 also contains two, twelve (12) fiber MTP adapters 20 on a rear side 22 of the fiber optic module 10 to support two (2) MTP fiber optic connectors 24, each supporting twelve (12) optical fibers. A cable harness 26 containing the fiber optic connectors 18, 24 on each end are plugged into fiber optic adapters 14, 20 to establish fiber optic connections between the fiber optic adapters 14, 20. In this manner, when fiber optic cables (not shown) external to the fiber optic module 10 are plugged into the fiber optic adapters 14, 20, optical connections are established between the fiber optic cables.

As can be seen in the fiber optic module 10, the fiber optic adapters 14, 20, and fiber optic connectors 18, 24 are fitted tightly inside the housing 12. Finger access between the fiber optic adapters 14, 20, and fiber optic connectors 18, 24 is limited and thus may be difficult to access when establishing and modifying connections and as well as when cleaning. As a result, the fiber optic adapters 14, 20, and/or the fiber optic connectors 18, 24 may be removed from the fiber optic module 10 to gain sufficient access and then re-installed. For example, the fiber optic connectors 18, 24 latched into the fiber optic adapters 14, 20 may be removed for cleaning during loss insertion testing. After cleaning, the operator may not fully latch a particular fiber optic connector 18, 24 back into a respective fiber optic adapter 14, 20. Even so, the fiber optic module 10 may still pass the loss insertion testing. However, subsequently during transport or operation, the partially latched fiber optic connector 18, 24 may vibrate or otherwise fall out of the fiber optic adapter 14, 20. As a result, a customer service call or report may be generated reporting a perceived broken optical fiber or component for a fiber optic module that does not actually exist.

Figure 2:
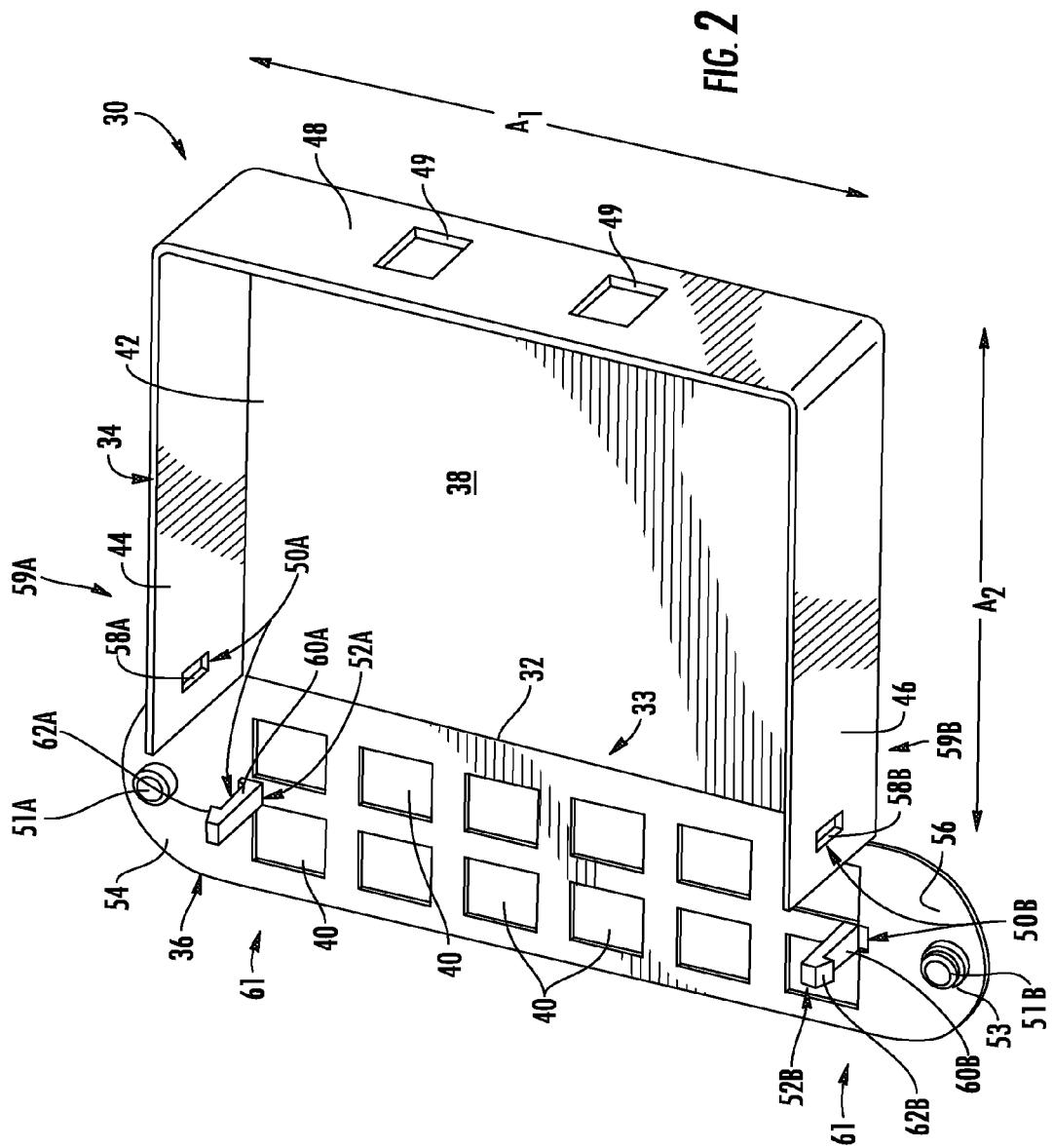
FIG. 2 is an exemplary one-piece fiber optic module housing incorporating a living hinge between an opened front panel and a main body of the fiber optic module housing.
Figure 3:
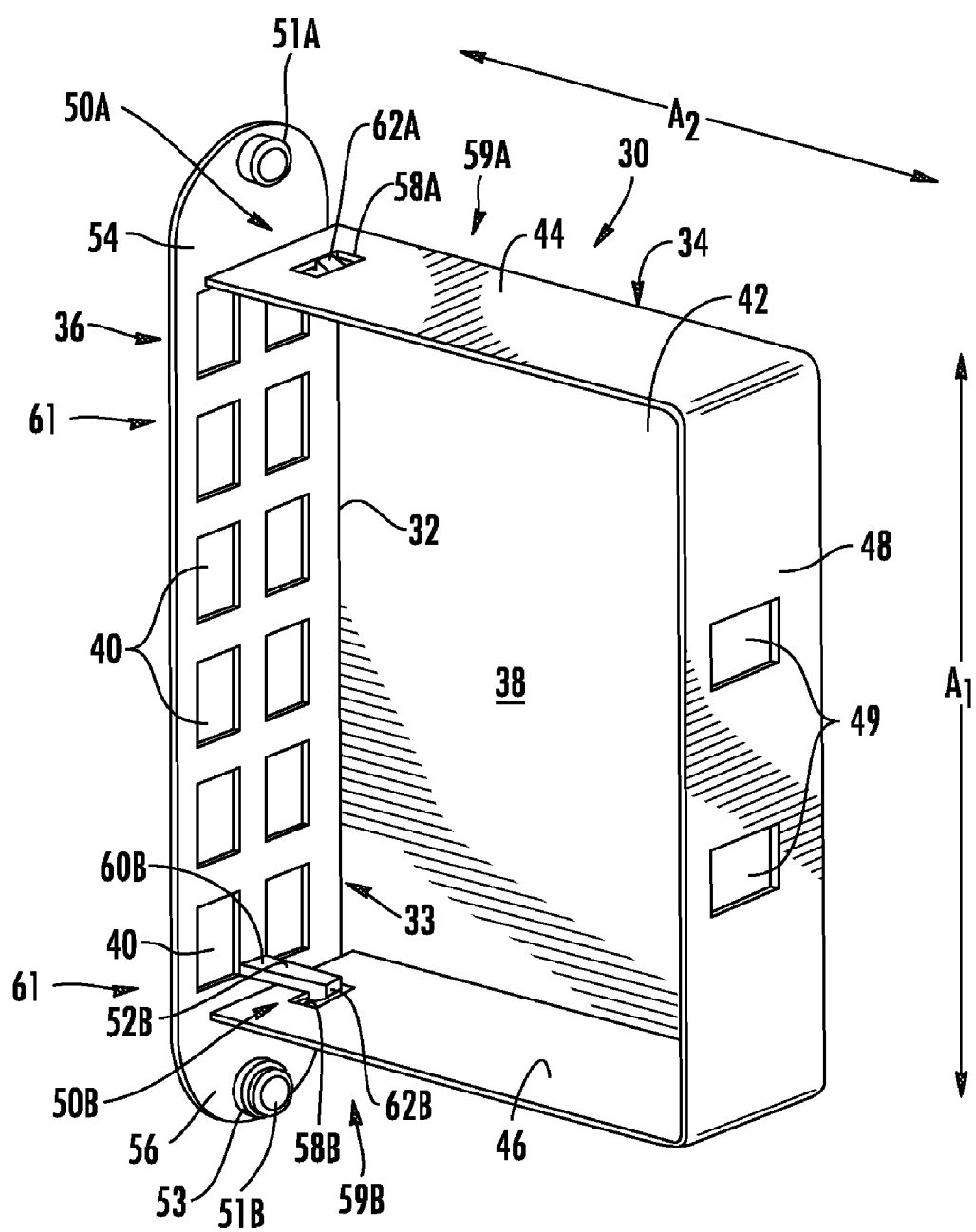
FIG. 3 is the fiber optic module housing of FIG. 2 with the front panel closed to the main body of the fiber optic module housing.
Figure 4:
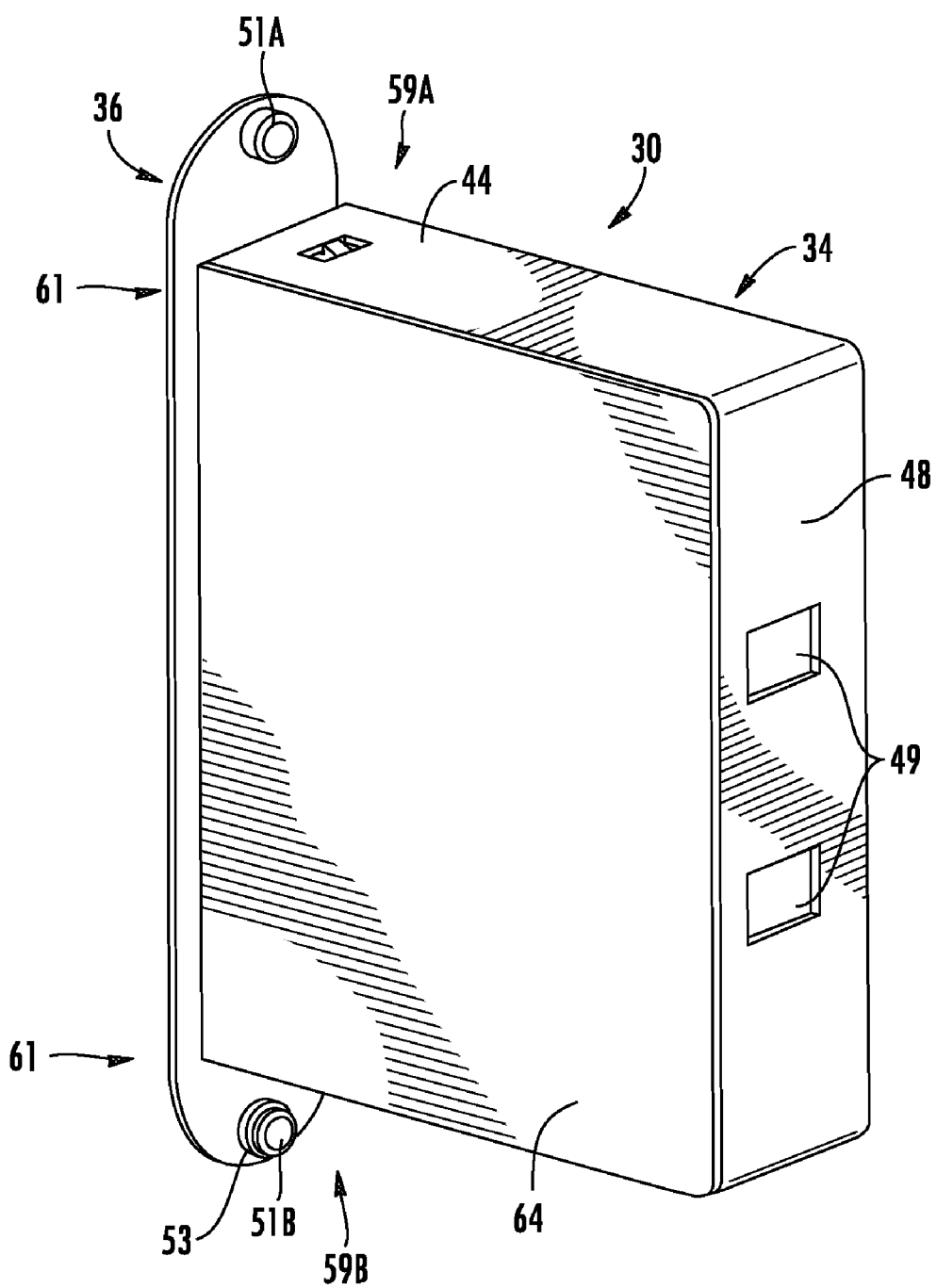
FIG. 4 is the fiber optic module housing of FIG. 3 with a side cover installed on the main body to seal off an internal chamber of the fiber optic module housing.

In this regard, FIGS. 2-4 illustrate a first embodiment of a fiber optic module housing 30 that incorporates a hinge to provide improved accessibility. The fiber optic module housing 30 is configured to support fiber optic adapters and connectors (not shown) to support fiber optic connections as part of a fiber optic module. In this regard, FIG. 2 illustrates a side perspective view of the fiber optic module housing 30 incorporating a hinge 32. The fiber optic module housing 30 is shown with its longitudinal axis $A_1$ aligned in a vertical or y-axis orientation and its latitudinal axis $A_2$ oriented in the horizontal or x-axis orientation. However, the fiber optic module housing 30 could be oriented such that its latitudinal axis $A_2$ is aligned in a vertical or y-axis orientation and its longitudinal axis $A_1$ aligned in a horizontal or x-axis orientation. Any other orientation is possible. The hinge 32 is disposed between a portion 33 of the main body 34 and a front panel 36. In this manner, the front panel 36 can rotate about the hinge 32 to open (as illustrated in FIG. 2) and close against or substantially against the main body 34 (as illustrated in FIG. 3). The ability to open the front panel 36 from the main body 34 allows enhanced accessibility into an internal chamber 38 inside the main body 34. The front panel 36 can also be opened about the hinge 32 to access any fiber optic components (not shown) disposed in the internal chamber 38. Examples of fiber optic components that can be supported and accessed in the internal chamber 38 include, but are not limited to, fiber optic adapters, connectors, and cable harnesses.

Because the front panel 36 is hingedly attached to the main body 34, the front panel 36 can also be opened from the main body 34 to access fiber optic components disposed in the fiber optic component openings 40 in the front panel 36. For example, fiber optic adapters (not shown) may be disposed in the fiber optic component openings 40, wherein a cable harness having fiber optic connectors and contained in the internal chamber 38 of the fiber optic module housing 20, is connected to the fiber optic adapters. The ability to open the front panel 36 changes the orientation of the front panel 36 and any fiber optic components disposed in the fiber optic component openings 40 of the front panel 36. In this manner, access to the fiber optic components is more convenient and does not require accessing the internal chamber 38 where a high density of fiber optic components may be provided thereby limiting access. For example, this enhanced access may be useful when cleaning fiber optic connectors disposed or attached to fiber optic components disposed in the fiber optic component openings 40.

Further, in this embodiment, the hinge 32 is a living hinge. A living hinge is a flexible and generally thin hinge or flexure bearing typically made from plastic that joins two rigid plastic parts together allowing them to bend along the line of the hinge. In this embodiment, the two rigid parts joined together by the hinge 32 are the front panel 36 and a base side 42 of the main body 34. In this embodiment, the hinge 32 is formed from a thinned section (i.e., thinner than the thickness of the main body 34 and front panel 36) of a plastic bend to allow movement or flexing. The minimal friction and light wear in the hinge 32 makes it useful to provide as a hinge between two parts. Further, a living hinge may be a low cost to manufacture. In this embodiment, the main body 34, the front panel 36, and the hinge 32 disposed therebetween can be made out of a Polypropylene resin. However a Polyethylene resin is also another suitable material choice. Any other material(s) may be used to form the front panel 36, the main body 34, and the hinge 32 disposed therebetween depending on the desired fatigue resistance of the hinge 32. Other examples include Valox and nylon. The fatigue resistance determines the functional life of the hinge 32, meaning the ability to resist fatigue after a given number of openings and closings.

The hinge 32 in FIG. 2 can be formed from an injection molding or extrusion process that creates the main body 34, the front panel 36, and the hinge 32 as a single part. In this embodiment, the main body 34 is comprised of the base side 42, top and bottom sides 44, 46, and a rear panel 48, which can also be formed from an injection molding or extrusion process as part of the single part along with the front panel 36 and the hinge 32. The top and bottom sides 44, 46, and the rear panel 48 are each arranged orthogonally or substantially orthogonally to the base side 42 during the molding process to form the internal chamber 38. The rear panel 48 in this embodiment also contains one or more fiber optic component openings 49 configured to support one or more fiber optic components for establishing fiber optic connections to fiber optic components disposed in the fiber optic component openings 40 disposed in the front panel 36.

In this embodiment, as illustrated in FIG. 2, the front panel 36 includes mounting orifices 51A, 51B that are configured to receive fasteners (not shown) for attaching the fiber optic module housing 30 to a chassis. Also, a grommet 53 may be disposed inside one or both of the mounting orifices 51A, 51B and configured to receive fasteners to secure the fiber optic module housing 30 to a chassis. Only one grommet 53 is illustrated as being disposed in a mounting orifice in FIGS. 2-4 (i.e., mounting orifice 51B); however, a grommet may also be disposed in mounting orifice 51A as well. Also in this embodiment, locking mechanisms 50A, 50B are provided, as illustrated in FIG. 2, to allow the front panel 36 to be locked or secured to the main body 34 when closed. This prevents the front panel 36 from swinging open unintendedly during manufacture, shipment, and/or during and after installation and so that any fiber optic components installed in the internal chamber 38 are protected, such as from dust and other debris. In this embodiment, the locking mechanisms 50A, 50B are provided in the form of latches 52A, 52B disposed in the front panel 36. Two latches 52A, 52B are disposed on the front panel 36: one latch 52A at a top section 54 of the front panel 36, and one latch 52B at a bottom section 56 of the front panel 36. However, any number of latches can be provided. Each latch 52A, 52B is configured to be received into a corresponding latch receiver 58A, 58B disposed on portions 59A, 59B on the top side 44 and bottom side 46, respectively, of the main body 34. The latches 52A, 52B are biased towards the main body 34. When the front panel 36 is closed against or substantially against the main body 34, latch fingers 60A, 60B move into the internal chamber 38 adjacent the top side 44 and bottom side 46, respectively, wherein latch ends 62A, 62B disposed on the ends of the latch fingers 60A, 60B move inside and engage into their respective latch receivers 58A, 58B. This is illustrated in FIG. 3. Because the latch ends 62A, 62B are biased toward the main body 34, the latch ends 62A, 62B remain secured inside the latch receivers 58A, 58B until released.

To open the front panel 36 after being latched, the latch fingers 60A, 60B are released from the latch receivers 58A, 58B by pushing in the latch fingers 60A, 60B disposed in the latch receivers 58A, 58B in the internal chamber 38. This action moves the latch ends 62A, 62B outside of the latch receivers 58A, 58B such that they are released. The front panel 36 will then be free to be opened about the hinge 32 from the main body 34 for access, as illustrated in FIG. 2. After access, the front panel 36 can then again be closed or substantially closed against the main body 34 and secured to the main body 34 via the locking mechanisms 50A, 50B, as illustrated in FIG. 3. Note that a reverse latching system could also be employed wherein latch receivers are disposed in the front panel 36 and the latches are disposed in a portion 61 of the main body 34. In this alternative, the latches would remain fixed on the main body 34 while the latch receivers move along with the movement of the front panel 36 about the hinge 32.

In FIGS. 2 and 3, the internal chamber 38 of the fiber optic module housing 30 was exposed so that the internal features of the fiber optic module housing 30 could be illustrated and discussed. However, after the fiber optic module housing 30 is constructed and fiber optic components are installed in the internal chamber 38 and disposed through the front panel 36 and rear panel 48, a side cover 64 is installed on the main body 34, as illustrated in FIG. 4. The side cover 64 closes off the main body 34 and the internal chamber 38 to provide structural integrity to the main body 34 and to protect fiber optic components disposed in the internal chamber 38. Although the side cover 64 is a separate part from the main body 34 in this embodiment, the side cover 64 becomes part of the fiber optic module housing 30 when installed. Any form of securing or attachment of the side cover 64 to the main body 34 can be employed, including but not limited to latches, including latches similar to the locking mechanisms 50A, 50B previously described, a groove and tongue arrangement, and an indention and protrusion arrangement as examples. Further, an adhesive or epoxy may be placed between the side cover 64 and the main body 34 to secure the two together, if desired, although such may not be necessary if the fiber optic module housing 30 does not require sealing, such as when provided in an indoor environment as an example.

The fiber optic module housing 30 can also be manufactured and assembled in different manners. In one embodiment, the fiber optic module housing 30 is created from a mold using a molding process to form a pre-molded part. The molding process can be any type of molding process desired, such as injection and insertion molding for example. An extrusions process may also be employed to form the fiber optic module housing 30. If injection or insertion molding is employed, material, such as a thermoset or thermplastic material, is injected or inserted into a container, mixed, and forced into a mold cavity of a mold. The mold cavity is designed to provide voided areas in the cavity that form the shape of the fiber optic module housing 30. In the example of the fiber optic module housing 30 of FIGS. 2-4, the mold contains a void area for the front panel 36, the main body 34, the locking mechanisms 50A, 50B, and other features of the fiber optic module housing 30.

The mold also contains a thinned section between the main body 34 and front panel 36 to form the living hinge 32. The material inserted in the mold then cools and hardens to the configuration of the mold cavity, which is the configuration of the fiber optic module housing 30. The mold may also be cured after insertion before the fiber optic module housing 30 is released and removed from the mold. The material inserted into the mold and thus used to form the fiber optic module housing 30 can include any type of polymer, including but not limited to polyethylenes, ethylene vinyl acetates (EVAs) thermoplastic olefins (TPOs), thermoplastic vulcanizates (TPVs), polyvinyl chlorides (PVCs), chlorinated polyethylene, styrene block copolymers, ethylene methyl acrylate (EMAs), ethylene butyl acrylates (EBAs) compounds, and the like. These materials can also be made biodegradable and fire retardant through the use of additives.

The mold may be formed using a well-known A/B style mold tool as an example. An A/B style mold tool has movement in an axis perpendicular to the parting line of the tool. In this instance, one half of the mold (e.g., A-side) is stationary and the other halve (e.g., B-side) moves. The mold halves are closed or clamped together under pressure. Molding material is injected or inserted into the mold wherein the fiber optic module housing 30 is molded after the molding material cools into a hardened form. To eject the fiber optic module housing 30 from the mold as a finished part, the moving side of the mold tool (e.g., B-side) opens and an ejector pin can be engaged to push the molded fiber optic module housing 30 out from the tool. As another well-known example, the mold tool may incorporate "side action," wherein movement in an axis parallel (or oblique) to the parting line or a rotational axis is provided. Any type or style of mold tool may be employed to mold the fiber optic module housing 30 as desired.

After the fiber optic module housing 30 is formed, a fiber optic module can be assembled using the fiber optic module housing 30. Assembly can occur immediately after the molding process, or during a separate assembly process. In most instances, assembly will be performed in a separate process with access to an inventory of fiber optic module housings 30 previously formed. In this regard, assembly embodiments include inserting fiber optic adapters (e.g., like or similar to the fiber optic adapters 14, 20 in FIG. 1) and a fiber optic cable harness (e.g., like or similar to the cable harness 26 in FIG. 1) into the fiber optic module housing 30. The fiber optic adapters are disposed through openings 40, 49 in the front panel 36 and rear panel 48. The fiber optic cable harness is installed in the internal chamber 38 of the fiber optic module housing 30 and connected to the fiber optic adapters. This assembly is applicable for both initial assemblies and reassemblies of the fiber optic cable harness and/or fiber optic adapters, such as for cleaning or repair. Before inserting a fiber optic cable harness into the internal chamber 38, the front panel 36 is unlatched from the latch receivers 58A, 58B. If the front panel 36 is already unlatched during assembly, then this task is skipped. Opening the front panel 36 provides greater finger access to the fiber optic module housing 30 and the internal chamber 38 for cleaning and installing the fiber optic cable harness.

Each fiber optic connector (e.g., like or similar to the fiber optic connectors 18, 24 in FIG. 1) from the fiber optic cable harness can be cleaned and installed into an appropriate opening 40, 49 in an appropriate sequence. For example, if the fiber optic cable harness is a twenty-four (24) optical fiber count harness comprised of twelve (12) duplex LC adapters and two (2) MTP adapters, each disposed on opposite ends of the fiber optic cable harness, the duplex LC adapters may be installed first. The duplex LC adapters are disposed or installed by a technician or operator ("operator") into the openings 40 in the front panel 36. Examples of duplex LC fiber optic adapters are illustrated in FIGS. 7 and 8 below. The MTP fiber optic adapters are disposed or installed in the openings 49 in the rear panel 48, examples of which are also illustrated in FIGS. 7 and 8 below. The operator can then install one or more fiber optic cable harnesses. The operator takes pre-connectorized ends of the fiber optic cable harness (es) and installs them into the internal chamber 38 of the fiber optic module housing 30. In this example, two (2) twelve (12) fiber optic cable harnesses are employed. The operator takes the first twelve (12) fiber, fiber optic cable harness and cleans the duplex LC connectors on an end of the fiber optic cable harness. The duplex LC connectors are then plugged into the duplex LC adapters disposed through the openings 40 on the front panel 36 in a predetermined order. For example, the order may be determined based on whether a classical or universal routing is provided. An example of universal routing is disclosed in U.S. Pat. No. 6,869,227, which is assigned to the assignee of the present application and is incorporated herein by reference in its entirety. The fiber optic cable harness can be looped inside the internal chamber 38 and the MTP connectors on the opposite end of the fiber optic cable harness from the duplex LC connectors are cleaned and plugged into the MTP adapters. At this time, any adjustments to the fiber optic cable harness looping(s) may be made to ensure that no minimum bend radii are violated.

Figure 5:
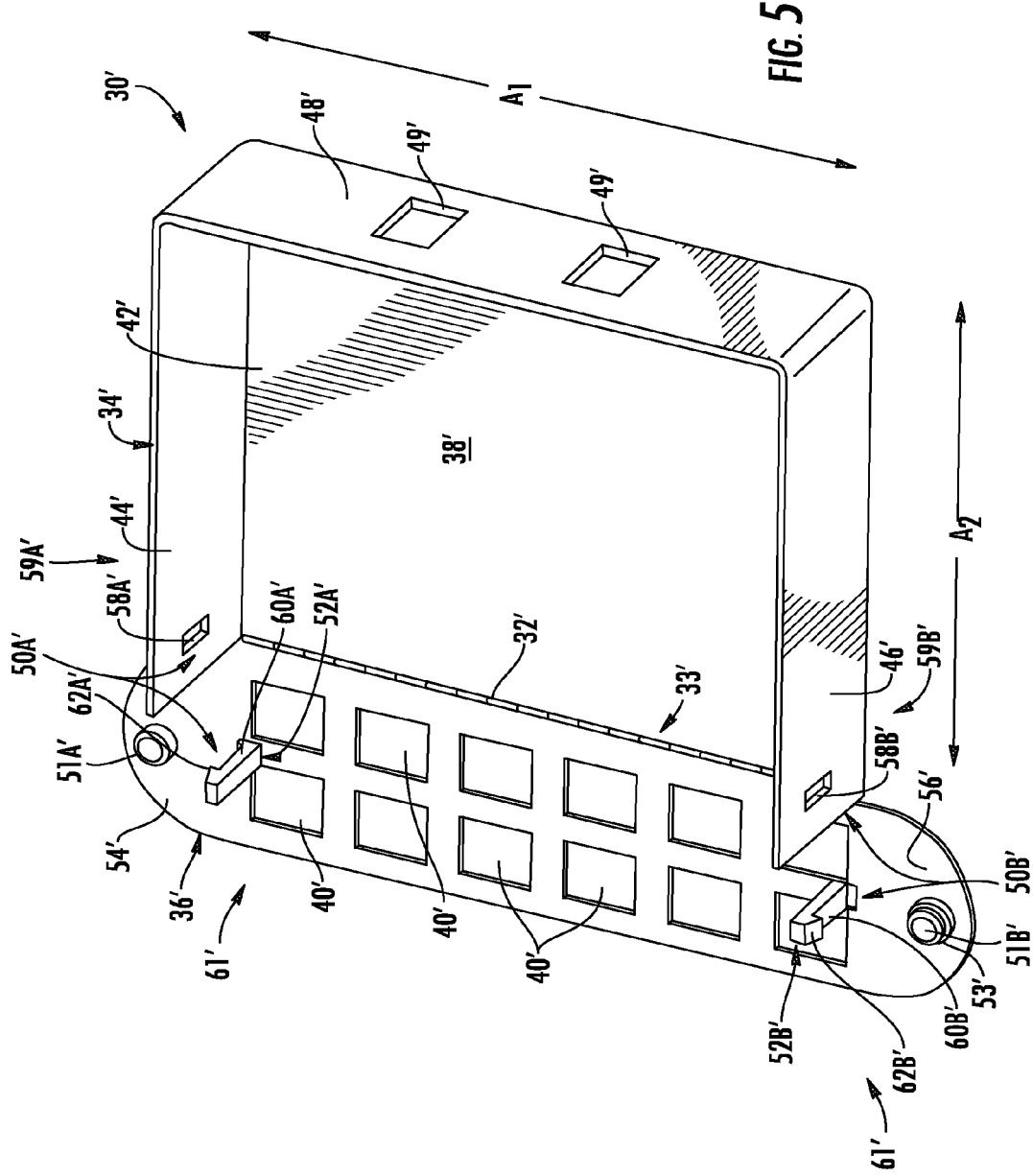
FIG. 5 is an exemplary fiber optic module incorporating a hinge between an opened front panel and a main body of the fiber optic module housing, wherein the hinge is a separate part from the front panel and fiber optic module housing.
Figure 6:
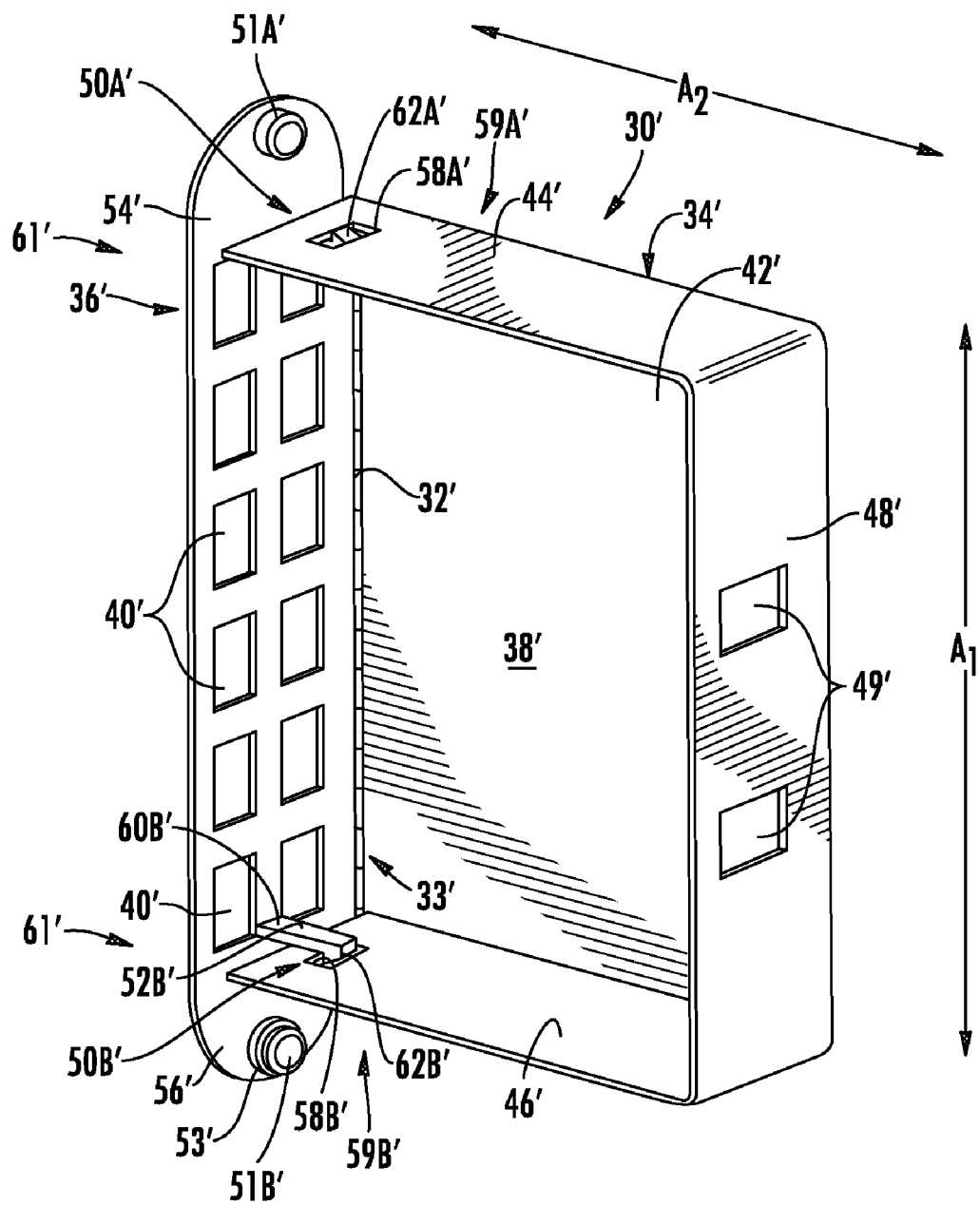
FIG. 6 is the fiber optic module housing of FIG. 5 with the front panel closed to the main body of the fiber optic module housing.

The side cover 64 (FIG. 4) may then be disposed or installed over the main body 34 to seal the internal chamber 38 and the fiber optic cable harness installed therein. The side cover 64 may be made from any material, including a polymer, metal, or aluminum as examples. Screws or other fasteners may be employed to secure the side cover 64 to the main body 34. The fasteners may be disposed as part of the fiber optic module housing 30 mold as opposed to separate parts. At this point, the fiber optic module housing 30 becomes a fiber optic module due to the fiber optic connectors disposed through the openings 40, 49 connected together by a fiber optic cable harness(es). As a result of the fiber optic module housing 30 and the hinge 32, the part count of the fiber optic module housing 30 can be reduced, and finger access and latching issues are addressed. The fiber optic module housing 30 can easily be accessed during initial cleaning and assembly and re-accessed for cleaning and repair. If modifications are necessary to the fiber optic module housing 30, the modifications can easily be made by modifying the mold. The fiber optic module housing 30 does not require tools or other fasteners to assemble during assembly. FIGS. 5 and 6 illustrate an alternate fiber optic module housing 30' to the fiber optic module housing 30 of FIGS. 2-4. The fiber optic module housing 30' is of similar construction and parts as the fiber optic module housing 30 in FIGS. 2-4, and thus similar parts are indicated by the same element number with the appendage of an apostrophe mark ('). However, in the fiber optic module housing 30' in FIGS. 5 and 6, the hinge 32' is not a living hinge. Instead, the hinge 32' is a separate part that is installed between a front panel 36' and a main body 34' in the fiber optic module housing 30'. Thus, the front panel 36' is not provided as part of a single part along with the main body 34'. The hinge 32' may be any type of hinge desired. Examples include a door hinge, a butt hinge, a continuous hinge, a concealed hinge, a tee hinge, a butterfly hinge, a barrel hinge, a strap hinge, and a friction hinge, as examples, just to name a few. The remaining elements and their functions in the fiber optic module housing 30' of FIGS. 5 and 6 have the same or essentially the same function as their counterparts in the fiber optic module housing 30 of FIGS. 2-4. The previous discussion of these elements and their functions are equally applicable for the fiber optic module housing 30' of FIGS. 5 and 6 and thus will not be repeated here again. Further, the previous discussion regarding the manufacture and assembly of the fiber optic module housing 30 for FIGS. 2-4 is equally applicable to the fiber optic module housing 30' of FIGS. 5-6 and thus will not be repeated.

FIGS. 7 and 8 illustrate another embodiment of a fiber optic module 80 and fiber optic module housing 82 that may be employed. In this embodiment, a rear panel 85 of the fiber optic module housing 82 is hingedly attached to a main body 84. This is opposed to a front panel being hingedly attached to a main body, as provided in embodiments illustrated in FIGS. 2-6. Like provided for the front panel 36 in the fiber optic module housing 30 in FIGS. 2-4, the rear panel 85 in FIGS. 7 and 8 is hingedly attached to the main body 84 via a living hinge 86 disposed between the rear panel 85 and a portion 87 of a main body 84 to provide improved accessibility. The same attributes and discussion regarding the living hinge provided above with respect to the fiber optic module housing 30 in FIGS. 2-4 is equally applicable for the living hinge 86 here and thus will not be repeated.

However, in this embodiment, a number of living panel hinges 88A, 88B are also disposed in the rear panel 85 that allow panel sections 90A-90C of the rear panel 85 to bend with respect to each other about the living panel hinges 88A, 88B. Providing panel hinges between panel sections of a fiber optic module housing panel may be useful for accessibility of fiber optic components, such as fiber optic adapters 92 disposed through fiber optic component openings 100 in the rear panel 85 as illustrated in FIGS. 7 and 8, if a panel is not substantially planar. In this embodiment, because the rear panel 85 is not comprised of coplanar surfaces, access to fiber optic components, such as the fiber optic adapters 92, disposed in the rear panel 85 may still be difficult even when the rear panel 85 is opened from the main body 84 about the living hinge 86. The inclusion of living panel hinges 88A, 88B provides more flexibility in accessing fiber optic components disposed in the rear panel 85. Note that in this embodiment, three (3) panel sections 90A-90C are provided; however, only one (1) or any number of panel sections 90 may be provided.

Turning back to FIGS. 7 and 8, the rear panel 85 can rotate about the living hinge 86 to open (as illustrated in FIG. 7) and close against or substantially against the main body 84 (as illustrated in FIG. 8) to allow accessibility into an internal chamber 94 inside the main body 84. The rear panel 85 can also be opened about the living hinge 86 to access any fiber optic components (not shown) disposed in the internal chamber 94. Examples of fiber optic components that can be supported in the internal chamber 94 include, but are not limited to, fiber optic adapters, connectors, and cable harnesses. These fiber optic components are used to establish fiber optic connections between fiber optic components (not shown) disposed in fiber optic component openings 96 in a front panel 98 and the fiber optic components disposed in the fiber optic component openings 100 in the rear panel 85.

Because the rear panel 85 is hingedly attached to the main body 84, the rear panel 85 can be opened from the main body 84 to access any fiber optic components (not shown) disposed in the internal chamber 94, for example, the fiber optic adapters 92 disposed in the fiber optic component openings 100. As another example, the rear panel 85 can be opened to access a cable harness (not shown) having fiber optic connectors connected to the fiber optic adapters 92. The cable harness may connect the fiber optic adapters 92 to fiber optic adapters 102 disposed in the fiber optic component openings 96 in the front panel 98.

In the fiber optic module housing 82 of FIGS. 7 and 8, the living hinge 86 is formed from an injection molding operation that creates the main body 84, the rear panel 85, and the living hinge 86 at one time as a single part. In this embodiment, the main body 84 is comprised of a base side 104, top and bottom sides 106, 108, and the rear panel 85, which are also formed from the injection molding operation as part of the single part with the rear panel 85 and the living hinge 86. The top and bottom sides 106, 108, and the rear panel 85 are each arranged orthogonally or substantially orthogonally to the base side 104 during the molding process to form the internal chamber 94. Also as part of the single part, the two living panel hinges 88A, 88B are also formed in the rear panel 85 to form the individual panel sections 90A-90C. Thus, when the fiber optic module housing 82 is assembled, the rear panel 85 can bend about the living hinge 86, and the panel sections 90A-90C can bend about the living panel hinges 88A, 88B.

To attach or close the rear panel 85 against or substantially against the main body 84, a top section 110 of the panel section 90C is secured to the top side 106 of the main body 84. In this embodiment, a locking mechanism 112 is provided in the form of a latch receiver 114 disposed in the top side 106 and configured to receive a latch 116 similar to the latch and latch receivers 58, 60 in FIGS. 2-4. Any other type of securing or locking mechanism or system may be employed, including but not limited to a latching system like that provided for the fiber optic module housings 30, 30' in FIGS. 2-6. To open the rear panel 85 after being secured to the main body 84, the rear panel 85 is unsecured or unlocked from the top side 106. The fiber optic module housing 82 can be installed if desired, into a fiber optic equipment housing, such as a chassis. The front panel 98 includes mounting orifices 118A, 118B that are configured to receive fasteners (not shown) for attaching the fiber optic module housing 82 to a chassis. Also, grommets (not shown) could be disposed in either or both of the mounting orifices 118A, 118B and configured to receive fasteners (not shown) to secure the fiber optic module housing 82 to a chassis.

Also in the illustrations of FIGS. 7 and 8, the internal chamber 94 of the fiber optic module 80 was exposed so that the internal features of the fiber optic module housing 82 could be illustrated and discussed. However, after the fiber optic module housing 82 is constructed and fiber optic components are installed in the internal chamber 94 and disposed through the front panel 98 and rear panel 85, a side cover (not shown) is installed on the main body 84, like that of the side cover 64 in FIG. 4 as an example. Further, the previous discussion regarding the manufacture and assembly of the fiber optic module housing 30 for FIGS. 2-4 is equally applicable to the fiber optic module housing 30' of FIGS. 7-8, except that living panel hinges 88A, 88B in the rear panel 85 of the fiber optic module housing 82 are provided in the mold. Access to the internal chamber 94 of the fiber optic module housing 82 for installing the fiber optic adapters 92, 102 and a fiber optic cable harness connecting the fiber optic adapters 92, 102 together are provided through the rear panel 85 as opposed to the front panel 98 in this embodiment.

In another embodiment, a fiber optic module housing is provided that is comprised of a single part that is foldable for assembly employing the use of living hinges. An example of such a fiber optic housing module 120 is illustrated in FIGS. 9 and 10. The fiber optic module housing 120 can be folded along certain sides during assembly to form an assembled housing used to provide a fiber optic module. FIG. 9 illustrates the fiber optic module housing 120 before being folded for assembly. As illustrated therein, the fiber optic module housing 120 is comprised of a main body 122 comprised of a first end section 124 and a second end section 126. Intermediate sections 128, 130 are disposed between the first end section 124 and the second end section 126. Living hinges 132, 134, 136 are disposed between each of the first end section 124 and the intermediate section 128, the intermediate section 128 and the intermediate section 130, and the intermediate section 130 and the second end section 126, respectively. In this manner, each of the section ends 124, 126 and the intermediate section 128 can fold about the intermediate section 130 and onto each other to form the main body 122 having an internal chamber 138 contained therein, as illustrated in FIG. 10. In this regard, the main body 122 can be constructed using a mold or extrusion process as a single part. The living hinges 132, 134, 136 are thinned sections between the first and second end sections 124, 126 and the intermediate sections 128, 130 that allow bending.

In addition to the main body 122 being a single part, the fiber optic module housing 120 of FIGS. 9 and 10 also provides for front and real panels 140, 142 to be provided in the single part separated from the main body 122 from living hinges 144, 146, respectively. In this manner, no sides or parts of the fiber optic module housing 120 need be provided as separate parts; the fiber optic module housing 120 can be manufactured as a single part. In this regard, the fiber optic module housing 120 is provided and shown as being oriented with its latitudinal axis $A_3$ in the horizontal or y-axis direction. The front panel 140 contains one or more fiber optic component openings 148 configured to receive one or more fiber optic components (not shown) for establishing fiber optic connections with one or more fiber optic components (not shown) disposed in one or more fiber optic component openings 150 disposed in the rear panel 142. Similar to the fiber optic module housing 30 in FIGS. 2-4 and the description provided therein, fiber optic connections can be established with fiber optic components disposed in the front and rear panels 140, 142 via cable harnesses or other fiber optic components and/or cables placed inside the internal chamber 138. A cable harness may be connectorized on each of the front and rear panels 140, 142 with fiber optic connectors that connect to fiber optic adapters disposed in the front and rear panels 140, 142 as an example.

The fiber optic module housing 120 in FIGS. 9 and 10 also contains one or more locking mechanisms 152 that allow the components of the fiber optic module housing 120, namely the first and second end sections 124, 126, the intermediate sections 128, 130, and the front and rear panels 140, 142, to be secured after folding so that they stay folded in place to provide an assembled fiber optic module housing 120, as illustrated in FIG. 10. As illustrated in FIG. 9, the locking mechanisms 152 are provided in the form of latches 154 and latch receivers 160. Two latches 154A, 154B are disposed on the front panel 140 like provided in the front panel 36 of the fiber optic module housing 30 in FIGS. 2-4. One latch 154A is disposed on a left section 157 of the front panel 140 and a second latch 154B is disposed on a right section 158 of the front panel 140. However, any number of latches can be provided. Each latch 154A, 154B is configured to be received into a corresponding latch receiver 160A, 160B disposed of portions 161 on the intermediate section 128 and second end section 126, respectively. The latches 154A, 154B are biased towards the main body 122. When the front panel 140 is closed against or substantially against the main body 122, latch fingers 162A, 162B move into the internal chamber 138 adjacent to the intermediate section 128 and second end section 126, respectively, wherein latch ends 164A, 164B disposed on the ends of the latch fingers 162A, 162B move inside and engage into their respective latch receivers 160A, 160B. This is illustrated in FIG. 10. Because the latch ends 164A, 164B are biased toward the main body 122, the latch ends 164A, 164B remain secured inside the latch receivers 160A, 160B until released.

To open the front panel 140 after being latched, the latch fingers 162A, 162B, are released from the latch receivers 160A, 160B by pushing the latch fingers 162A, 162B disposed in the latch receivers 160A, 160B in towards the internal chamber 138, thus moving the latch ends 164A, 164B outside of the latch receivers 160A, 160B. Thereafter, the front panel 140 will then be free to be opened about the living hinge 144 from the main body 122 for access. After access, the front panel 140 can then again be closed or substantially closed against the main body 122 and secured to the main body 122 via the locking mechanisms 152A, 152B. Note that a reverse latching system could also be employed wherein the latch receivers 160 were disposed in the front panel 140 and the latches 154 were disposed in the portion 161 of the main body 122. In this alternative, the latches 154 would remain fixed on the main body 122 while the latch receivers 160 move along with the movement of the front panel 140 about the living hinge 144. The rear panel 142 also contains latches 154C, 154D that are configured to engage with latch receivers 160C, 160D like that of the latches 154A, 154B and latch receivers 160A, 160B. Thus, the discussion and operation of the latches 154A, 154B and latch receivers 160A, 160B are applicable for the latches 154C, 154D and latch receivers 160C, 160D and will not be repeated herein.

The main body 122 also contains a locking mechanism 152 to assemble the main body 122 to form the internal chamber 138. The main body 122 may be assembled first before the front panel 140 is secure to the main body 122. As illustrated in FIG. 9, the first end section 124 contains a latch 154E that is configured to engage with a latch receiver 160E after the first and second section ends 124, 126 and intermediate sections 128, 130 are folded about each other to form the main body 122 with the internal chamber 138 contain therein. The latch 154E and latch receiver 160E work like latches 154A, 154B and latch receivers 160A, 160B disposed in the front panel 140 and the main body 122. Thus, the discussion and operation of the latches 154A, 154B and the latch receivers 160A, 160B are equally applicable for latch 154E and latch receiver 160E, and will not be repeated herein.

After the fiber optic module housing 120 in FIG. 9 is fully assembled, the fiber optic module housing 120 appears as illustrated in FIG. 10. The fiber optic module housing 120 can then be installed, if desired, into a fiber optic equipment housing, such as a chassis. The front panel 140 includes mounting orifices 162A, 162B that are configured to receive fasteners (not shown) for attaching the fiber optic module housing 120 to a chassis. Also, grommets (not shown) could be disposed in either or both of the mounting orifices 162A, 162B and configured to receive fasteners (not shown) to secure the fiber optic module housing 120 to a chassis. If access to the internal chamber 138 is needed, either the latch 154E can be released to open the main body 122, or latches 154A, 154B and/or 154C, 154D can be released to open the front and rear panels 140, 142, respectively. Further, the front panel 140 can be opened by releasing latches 154A, 154B from latch receivers 160A, 160B. Similarly, the rear panel 142 can be opened by releasing latches 154C, 154D from latch receivers 160C, 160D. In each case, a living hinge allows a component of the fiber optic module housing 120 to be retracted and bent, or opened or closed, from the other components for access. The fiber optic module housing 120 could also be completely disassembled and reassembled at any time, if desired. Complete disassembly such that the fiber optic module housing 120 lays flat in its single part may be desired for ease in cleaning.

The fiber optic module housing 120 can also be manufactured and assembled in different manners. In one embodiment, the fiber optic module housing 120 is created from a mold using a molding process to form a pre-molded part similar to the fiber optic module housing 30 of FIGS. 2-4. The molding process can be any type of molding process desired, such as injection and insertion molding for example. An extrusions process may also be employed to form the fiber optic module housing 120. If injection or insertion molding is employed, material, such as a thermoset or thermplastic material, is injected or inserted into a container, mixed, and forced into a mold cavity of a mold. The mold may be formed using an A/B style mold tool, a mold tool incorporating "side action," or any other type of mold tool desired. The mold cavity is designed to provide voided areas in the cavity that form the shape of the fiber optic module housing 120. In the example of the fiber optic module housing 120 of FIGS. 8-9, the mold contains void areas designed to form the first and second end sections 124, 126, the intermediate sections 128, 130, the front panel 140, and the rear panel 142 as a substantially flat single piece. The mold also forms the locking mechanisms 152A-D as part of the single piece mold. The mold also contains thinned sections to form the living hinges 132, 134, 136, 144, and 146. The material inserted in the mold then cools and hardens to the configuration of the mold cavity, which is the configuration of the fiber optic module housing 120. The mold may also be cured after insertion before the fiber optic module housing 120 is released and removed from the mold. The material inserted into the mold and thus used to form the fiber optic module housing 30 can include any type of polymer, including but not limited to polyethylenes, ethylene vinyl acetates (EVAs) thermoplastic olefins (TPOs), thermoplastic vulcanizates (TPVs), polyvinyl chlorides (PVCs), chlorinated polyethylene, styrene block copolymers, ethylene methyl acrylate (EMAs), ethylene butyl acrylates (EBAs) compounds, and the like. These materials can also be made biodegradable and fire retardant through the use of additives.

After the fiber optic module housing 120 is formed, a fiber optic module can be assembled using the fiber optic module housing 120. Because the fiber optic module housing 120 is formed into a single substantially flat piece, there are no limitations on finger access for cleaning and assembly. Assembly can occur immediately after the molding process, or during a separate assembly process. In most instances, assembly will be performed in a separate process with access to an inventory of fiber optic module housings 120 previously formed. This assembly is applicable for both initial assemblies and reassemblies of the fiber optic cable harness and/or fiber optic adapters, such as for cleaning or repair. In this regard, assembly embodiments include inserting fiber optic adapters (e.g., like or similar to the fiber optic adapters 14, 20 in FIG. 1) and a fiber optic cable harness (e.g., like or similar to the cable harness 26 in FIG. 1) into the fiber optic module housing 120. The fiber optic adapters are disposed through openings 148, 150 in the front panel 140 and the rear panel 142, respectively. The openings 148, 150 are oriented downward instead of perpendicular to a base, as provided in the fiber optic module 30 of FIGS. 2-4, for example. This provides full finger access with no limiting sidewalls. Before inserting a fiber optic cable harness into the internal chamber 138, the front panel 140 is unlatched from the latch receivers 160A, 160B.

Each fiber optic connector (e.g., like or similar to the fiber optic connectors 18, 24 in FIG. 1) from the fiber optic cable harness can be cleaned and disposed or installed into an appropriate opening 148, 150 in an appropriate sequence. For example, if the fiber optic cable harness is a twenty-four (24) optical fiber count harness comprised of twelve (12) duplex LC adapters and two (2) MTP adapters, each disposed on opposite ends of the fiber optic cable harness, the duplex LC adapters may be disposed or installed first. The duplex LC adapters are disposed or installed by a technician or operator ("operator") into the openings 148 in the front panel 140. Examples of duplex LC fiber optic adapters are illustrated in FIGS. 7 and 8 above. The MTP fiber optic adapters are disposed or installed in the openings 150 in the rear panel 142, examples of which are also illustrated in FIGS. 7 and 8.

The operator can then install one or more fiber optic cable harnesses. The operator takes pre-connectorized ends of the fiber optic cable harness(es) and installs them into the fiber optic module housing 120. In this example, two (2) twelve (12) fiber optic cable harnesses are employed. The operator takes the first twelve (12) fiber, fiber optic cable harness and cleans the duplex LC connectors on an end of the fiber optic cable harness. The duplex LC connectors are then plugged into the duplex LC adapters disposed through the openings 148 on the front panel 142 in a predetermined order. For example, the order may be determined based on whether a classical or universal routing is provided. An example of universal routing is disclosed in U.S. Pat. No. 6,869,227 previously referenced above. Once the duplex LC connectors of the fiber optic cable harness(es) are connected, the first end section 126 and the second end section 128 of the fiber optic module housing 120 are folded up via the living hinges 136 and 134, respectively. Then, the front panel 140 is folded up via the living hinge 144. The latch ends 164A, 164B are engaged with the latch receivers 160A, 160B. The first end section 124 hinged around the living hinge 132 may remain folded back out of the way until needed. Alternatively, each living hinge 132, 134, 136 may be pre-folded prior to assembly of the fiber optic module housing 120 for ease of assembly. Once the first end section 124, the intermediate section 128, and the second end section 126 of the fiber optic module housing 120 are secure, the fiber optic cable harness can be looped inside the internal chamber 138 formed therein. If two fiber optic cable harnesses are employed, the first fiber optic cable harness is attached to a bottom row of duplex LC adapters disposed through the openings 148. A second fiber optic cable harness is attached to the top row of duplex LC adapters disposed through the openings 148. The MTP connectors on the opposite end of the fiber optic cable harness(es) from the duplex LC connectors are cleaned and plugged into the MTP adapters disposed through openings 150 on the rear panel 142. In this embodiment, the MTP connectors are plugged into the MTP adapters while the front panel 140 is in the open position. However, this may also be performed after the front panel 140 is closed, or as the front panel 140 is being closed. Once or as the MTP connectors are plugged into the MTP adapters, the rear panel 142 is closed via the living hinge 146. Again, the latch ends 164C, 164D will engage the latch receivers 160C, 160D to secure the fiber optic module housing 120. At this time, any adjustments to the fiber optic cable harness looping(s) may be made to ensure that no minimum bend radii are violated. The first end section 124 is folded closed via living hinge 132 with the latch end 164E engaging into the latch receiver 160E to secure the first end section 124 thereby forming a lid.

At this point, the fiber optic module housing 120 becomes a fiber optic module due to the fiber optic connectors disposed through the openings 148, 150 connected together by a fiber optic cable harness(es). As a result of the fiber optic module housing 120 and the living hinges 132, 134, 136, 144, 146, the part count of the fiber optic module housing 120 can be reduced, and finger access and latching issues are addressed. The fiber optic module housing 120 can easily be accessed during initial cleaning and assembly and re-accessed for cleaning and repair. If modifications are necessary to the fiber optic module 120, the modifications can be easily made by modifying the mold. The fiber optic module housing 120 does not require tools or other fasteners to assemble during assembly.

Fiber optic module housings and modules that are discussed herein encompass any type of fiber optic module and of any size or orientation. The fiber optic module housings disclosed herein can support any type of fiber optic components. Fiber optic components can include adapters or connectors of any connection type, including but not limited to LC, SC, ST, LCAPC, SCAPC, MTRJ, and FC fiber optic connection types. Any type of hinge may be disposed between adjacent sections or panels of the fiber optic module housing. Providing a living hinge allows certain components to be manufactured as one part. The components or parts of the fiber optic module housing can be of any type or material. If incorporating a living hinge, the material used is one that allows for a living hinge to be created into a part. An injection or extrusion molding processes can be employed to construct the fiber optic module housings, which are then assembled during manufacture. The fiber optic module housing may support fiber optic adapters, connectors, or any other type of fiber optic component or optical fiber components. A fiber optic cable connected to a fiber optic module comprised of the fiber optic module housing or contained inside the fiber optic module housing, including but not limited to a cable harness, may include one or more optical fibers.

Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. Many modifications and other embodiments of the invention set forth herein will come to mind to one skilled in the art to which the invention pertains having the benefit of the teachings presented in the foregoing descriptions and the associated drawings. These modifications include, but are not limited to, the type of chassis, the configuration of the fiber optic module housing, the type of fiber optic connectors and/or adapters provided in the fiber optic module housing and a cable harness contained therein.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A method of manufacturing a fiber optic module housing, comprising:
    injecting a molding material into a fiber optic module housing mold, wherein the molding material injected into the fiber optic module housing mold defines:
        a main body defining an internal chamber therein configured to support one or more fiber optic components;
        one or more panels each having at least one fiber optic component opening; and
        a thinned section comprising one or more living hinges each disposed between a portion of the main body and the one or more panels, wherein the one or more panels are configured to open from and against or substantially against the main body about the one or more living hinges;
    curing the molding material injected into the fiber optic module housing mold to form a fiber optic module housing; and
    releasing the fiber optic module housing from the fiber optic module housing mold.

2. The method of claim 1, wherein the fiber optic module housing mold further defines one or more locking mechanisms disposed between the one or more panels and a second portion of the main body to secure the one or more panels against or substantially against the main body.

3. The method of claim 2, wherein the fiber optic module housing mold further defines one or more locking mechanism releases provided as part of the one or more locking mechanisms.

4. The method of claim 1, wherein the one or more panels defined by the fiber optic module housing mold define a front panel configured to open from and close against or substantially against a front side of the main body about the one or more living hinges.

5. The method of claim 1, wherein the one or more panels defined by the fiber optic module housing mold define a rear panel configured to open from and close against or substantially against a rear side of the main body about the one or more living hinges.

6. The method claim 1, wherein the fiber optic module housing mold further defines at least one panel hinge disposed in the one or more panels.

7. The method of claim 1, wherein the main body defined by the fiber optic module housing mold further comprises a first end section and a second end section and one or more living hinges disposed between the first end section and the second end section.

8. The method of claim 7, wherein the fiber optic module housing mold further defines one or more locking mechanisms disposed between the first end section and the second end section and configured to interlock to form the internal chamber in the main body.

9. The method of claim 7, wherein the main body defined by the fiber optic module housing mold further comprises one or more intermediate sections disposed between the first end section and the second end section.

10. The method of claim 1, wherein the molding material is a compound comprised from the group consisting of a Polyethylene, a Polypropylene, Valox, Nylon, a polyethylene, an ethylene vinyl acetate (EVA) a thermoplastic olefin (TPO), a thermoplastic vulcanizate (TPV), a polyvinyl chloride (PVC), a chlorinated polyethylene, a styrene block copolymer, an ethylene methyl acrylate (EMA), and an ethylene butyl acrylate (EBA).

11. The method of claim 1, wherein the injecting comprises injecting the molding material into a single part fiber optic module housing mold.

12. The method of claim 1, further comprising disposing at least one fiber optic component through the at least one fiber optic component opening.

13. The method of claim 1, further comprising inserting a fiber optic cable harness into the internal chamber.

14. The method of claim 1, further comprising connecting a fiber optic cable harness to a fiber optic component disposed through the at least one fiber optic component opening.

15. A method of manufacturing a fiber optic module housing, comprising:
    extruding a fiber optic module housing from a material, wherein the fiber optic module housing defines:
        a main body defining an internal chamber therein configured to support one or more fiber optic components;
        one or more panels having at least one fiber optic component opening; and
        one or more thinned sections comprising one or more living hinges disposed between a portion of the main body and the one or more panels, wherein the one or more panels are configured to open from and against or substantially against the main body about the one or more living hinges.

16. The method of claim 15, wherein the fiber optic module housing further defines one or more locking mechanisms disposed between the one or more panels and a second portion of the main body to secure the one or more panels against or substantially against the main body.

17. The method of claim 15, wherein the one or more panels defined by the fiber optic module housing define a front panel configured to open from and close against or substantially against a front side of the main body about the one or more living hinges.

18. The method of claim 15, wherein the one or more panels defined by the fiber optic module housing define a rear panel configured to open from and close against or substantially against a rear side of the main body about the one or more living hinges.

19. The method claim 15, wherein the fiber optic module housing further defines at least one panel hinge disposed in the one or more panels.

20. A method of assembly of a fiber optic module, comprising:
    providing a fiber optic module housing comprised of:
        a main body configured to support one or more fiber optic components;
        one or more panels each having at least one fiber optic component opening; and
        one or more living hinges each disposed between a portion of the main body and the one or more panels, wherein the one or more panels are configured to open from and against or substantially against the main body about the one or more living hinges;
    opening the one or more panels from the main body;
    forming an internal chamber in the main body by folding a first end section and a second end section of the main body and one or more living hinges disposed between the first end section and the second end section; and
    disposing at least one fiber optic component in the fiber optic module housing.

21. The method of claim 20, wherein the disposing comprises disposing at least one fiber optic adapter through the at least one fiber optic component opening.

22. The method of claim 20, further comprising disposing a fiber optic cable harness in the internal chamber.

23. The method of claim 22, further comprising connecting the fiber optic cable harness to the at least one fiber optic component.

24. The method of claim 20, further comprising closing the one or more panels against or substantially against the main body about the one or more living hinges.

25. The method of claim 20, further comprising locking the first end section to the second end section.

26. The method of claim 20, further comprising folding one or more intermediate sections disposed between the first end section and the second end section.

* * * * *